(12) United States Patent
Kim

(10) Patent No.: US 6,192,016 B1
(45) Date of Patent: Feb. 20, 2001

(54) DATA RECOVERY APPARATUS AND METHOD FOR OPTICAL DISK REPRODUCTION SYSTEMS

(75) Inventor: Il-kwon Kim, Seoul (KR)

(73) Assignee: Samsung Electronics Co., LTD (KR)

( * ) Notice: Under 35 U.S.C. 154(b), the term of this patent shall be extended for 0 days.

(21) Appl. No.: 09/187,626

(22) Filed: Nov. 6, 1998

(30) Foreign Application Priority Data

Nov. 10, 1997 (KR) .................................................. 97-59071

(51) Int. Cl.$^7$ ....................................................... G11B 5/76
(52) U.S. Cl. ................................................ 369/59; 369/48
(58) Field of Search ................................... 369/47, 48, 49, 369/54, 59, 124.04, 124.05, 124.14; 360/26, 27, 28, 29, 30, 32

(56) References Cited

U.S. PATENT DOCUMENTS 5,469,091  11/1995  Takahashi et al. .

OTHER PUBLICATIONS

Nikkei Electronics (No. 679), Jan. 6, 1997, pp. 127–134.
Nakajima et al., "Astudy of PRML systems for a phase change optical disk," Technical Report of IEICE, pp. 45–50, Dec. 1995.
Uehara, "Paralleism in Analog and Digital PRML Magnetic Disk Read Channel Equalizers," IEEE Transactions on Magnetics, vol. 31; No. 2, pp. 1174–1179, Mar. 1995.
Woods, "Comparison and Optimization of Digital Read Channels Using Actual Data," IEEE, pp. 1474–1478 (1993).
Wood et al., "Viterbi Detection of Class IV Partial Response on a Magnetic Recording Channel," IEEE Transactions on Communications, vol. Com–34; No. 5, pp. 454–461, May 1986.

*Primary Examiner*—Paul W. Huber
(74) *Attorney, Agent, or Firm*—Samuels, Gauthier & Stevens LLP

(57) ABSTRACT

In a data recovery apparatus and method for an optical disk reproduction system, a technique for digital recovery of data from an analog radio frequency (RF) signal is provided. An analog-to-digital converter (ADC) converts an analog radio frequency (RF) signal into a digital signal in response to a reference clock signal. A first adder combines an asymmetry error level to the digital RF signal. An adaptive digital equalizer digitally controls the level of the result added by the first adder, in response to a control signal. A digital level detector calculates the asymmetry error amount using the result added by the first adder, and outputs the control signal according to the output of the adaptive digital equalizer and predetermined coefficients. A viterbi decoder decodes the output of the adaptive digital equalizer into a bit train. A digital edge detector calculates the accuracy of sampling by the analog-to-digital converter, using the result added by the first adder, and outputs phase and frequency control signals according to the calculated accuracy. A reference signal generator outputs the reference clock signal having a frequency which varies in response to the phase and frequency control signals. Thus, data can be accurately recovered.

18 Claims, 8 Drawing Sheets

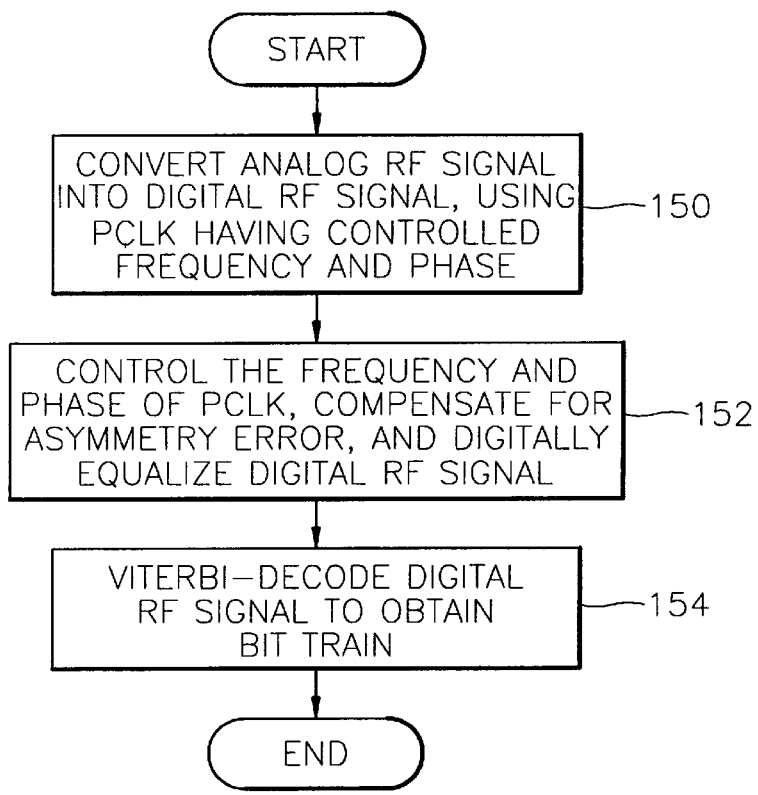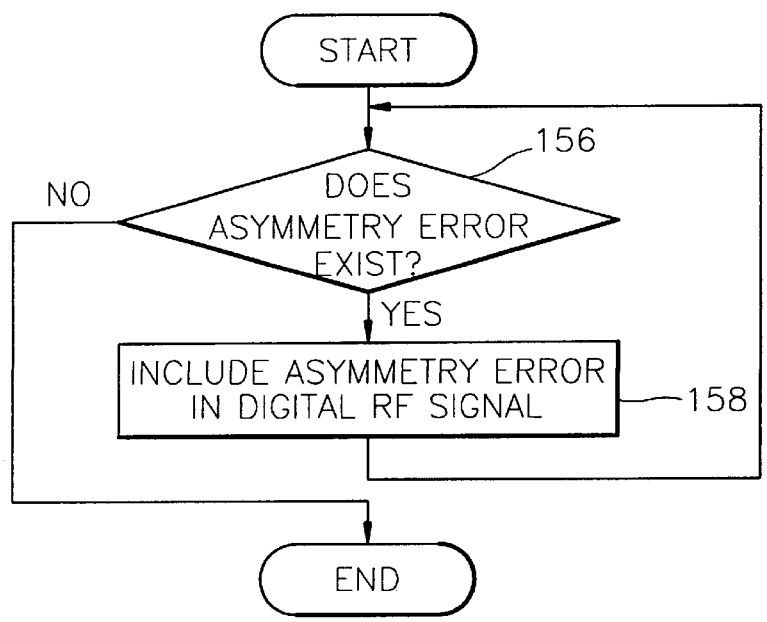

DATA RECOVERY APPARATUS AND METHOD FOR OPTICAL DISK REPRODUCTION SYSTEMS

BACKGROUND OF THE INVENTION

In a contemporary compact disk (CD) system, a photodiode senses light transmitted to a disk by an optical pickup and converts the sensed, reflected optical signal into an analog RF signal. The analog RF signal output of the photodiode is provided to a data slice unit, where asymmetry in the signal is corrected. The asymmetry-corrected signal is provided to a peak detector, where it is converted into a rectangular signal on the basis of a predetermined bias level. An edge detector detects edges in the rectangular signal, and outputs pulses generated at the detected edges to an eight-to-fourteen demodulator (EFDM). The EFDM receives, in units of 14 bits, the pulse train generated at the detected edges, converts each 14-bit signal into an 8-bit signal, and outputs the converted 8-bit signal to an error corrector.

With ever-increasing optical disk recording density, digital video disk (DVD) systems have recently appeared. A DVD system recovers data from an analog RF signal for the EFDM, in a manner similar to the aforementioned CD system. However, data recorded at such high density must be recovered digitally, to minimize data loss, since analog recovery is unsuitable for adaptive recovery of data for the EFDM, due to variances in the type of optical disk and differences in manufacturing processes. Additionally, with an increase in demand for high-speed transmission and high density recording, when data is recovered according to the analog technique, data quality is adversely affected due to interference between signals.

SUMMARY OF THE INVENTION

To address the aforementioned problems, the present invention is directed to a data recovery apparatus in an optical disk reproduction system, for digital recovery of data for an EFDM from an analog radio-frequency (RF) signal. The present invention further relates to a data recovery method for such a system.

It is therefore an object of the present invention to provide a data recovery apparatus and method for an optical disk reproduction system, adapted to digitally recover data from an analog RF signal to be provided to an EFDM.

The apparatus of the present invention is directed to a data recovery system in an optical disk reproduction system including a photodiode and an eight to fourteen demodulator (EFDM) for converting the pattern of a bit train, the data recovery system comprising: an analog-to-digital converter for converting an analog radio frequency (RF) signal input from the photodiode into a digital signal in response to a reference clock signal, and outputting the converted signal as a digital RF signal; a first adder for adding an asymmetry error amount of the digital RF signal to the digital RF signal; an adaptive digital equalizer for digitally controlling the level of the result added by the first adder, in response to a control signal; a digital level detector for calculating the asymmetry error amount using the result added by the first adder, and outputting the control signal according to the output of the adaptive digital equalizer and predetermined coefficients; a viterbi decoder for viterbi-decoding the output of the adaptive digital equalizer into the bit train and outputting the decoded bit train to the EFDM; a digital edge detector for calculating accuracy of sampling by the analog-to-digital converter, using the result added by the first adder, and outputting phase and frequency control signals according to the calculated accuracy; and a reference signal generator for outputting the reference clock signal having a frequency which varies in response to the phase and frequency control signals.

The method of the present invention is directed to a data recovery method operable in an optical disk reproduction system including a photodiode for outputting an analog RF signal and an eight to fourteen demodulator (EFDM) for converting the pattern of a bit train, the method comprising the steps of: (a) obtaining a digital RF signal by converting the analog RF signal into a digital signal by sampling corresponding to a reference clock signal; (b) determining whether an asymmetry error exists, using the digital RF signal; (c) correcting the asymmetry error with including the asymmetry error amount in the digital RF signal, if the asymmetry error exists, and returning to the step (b); (d) determining whether sampling was performed accurately, if no asymmetry error exists; (e) obtaining frequency and phase errors using the digital RF signal in which the asymmetry error was corrected, if the sampling was not accurately performed; (f) oscillating a frequency according to the frequency and phase errors, obtaining the reference clock signal having an oscillated frequency, and proceeding to the step (d); (g) digitally adjusting a quantized level of the digital RF signal whose asymmetry error was corrected and which was converted by accurate sampling, using the reference clock signal, if the sampling was performed accurately; (h) determining whether a quantized level arbitrarily extracted within a positive or negative 3T section is an estimated quantized level corresponding to the 3T, where T is the period of the reference clock signal, and proceeding to the step (g); and (i) obtaining the bit train by viterbi-decoding the digital RF signal having the adjust quantized level, if the quantized level is not the same as the estimated quantized level.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a flow diagram illustrating a data recovery method according to the present invention, performed, for example in the apparatus shown in FIG. 1.

FIG. 7 is a flow diagram illustrating the asymmetry error compensation method of step 152 shown in FIG. 6, according to the present invention.

DETAILED DESCRIPTION OF PREFERRED EMBODIMENTS

Figure 1:
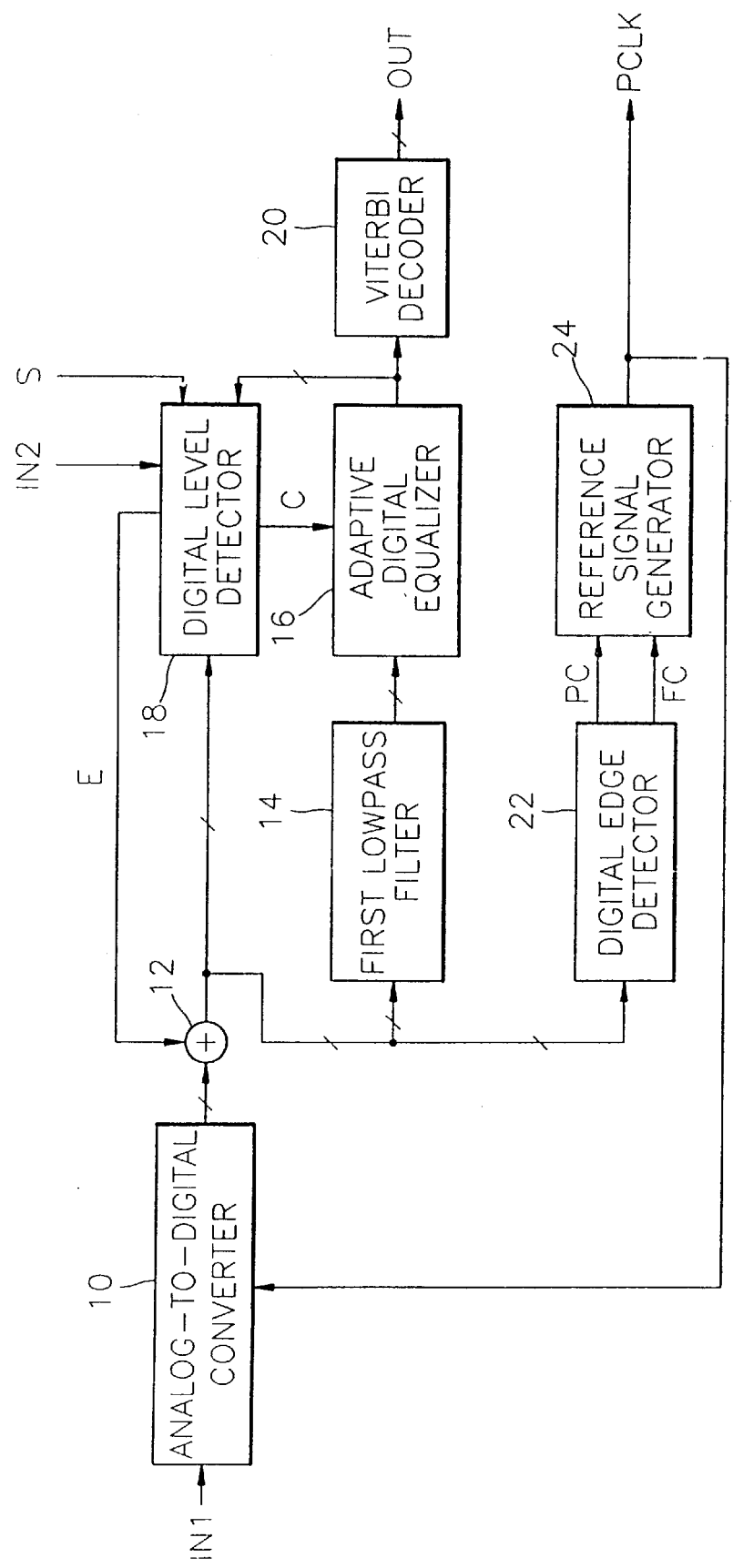
FIG. 1 is a block diagram of a data recovery apparatus for an optical disk reproduction system according to the present invention.

Referring to FIG. 1, a data recovery apparatus for an optical disk reproduction system according to the present invention comprises an analog-to-digital converter 10, a first adder 12, a first lowpass filter 14, an adaptive digital equalizer 16, a digital level detector 18, a viterbi decoder 20, a digital edge detector 22 and a reference signal generator 24.

The analog-to-digital converter 10 receives an analog RF signal generated by a photodiode (not shown) via an input port IN1, converts the analog RF signal into a digital RF signal in response to a reference clock signal PCLK generated by the reference signal generator 24, and outputs the converted digital RF signal to the first adder 12. The first adder 12 combines an error signal E representing the degree of asymmetry error provided by the digital level detector 18 with the digital RF signal provided by the analog-to-digital converter 10, and outputs a sum signal as an asymmetry error-corrected digital RE signal. The sum is provided to the digital level detector 18, the first lowpass filter 14 and the digital edge detector 22.

The first lowpass filter 14 allows the lowpass component of the output of the first adder 12 to pass, and moves noise from the digital RF signal received from the first adder 12. The filtered lowpass component of the sum signal is provided to the adaptive digital equalizer 16.

The digital level detector 18 provides two functions: first it compensates for the asymmetry error in the RF signal, and second, it controls the gain of the adaptive digital equalizer 16 to compensate for attenuation of the RF signal according to the type of disk. In order to perform the first function, the digital level detector 18 calculates an asymmetry error amount E as a function of the sum signal output of the first adder 12 and in further response to a selection signal S, and outputs the calculated asymmetry error amount E to the first adder 12. To accomplish the second function, the digital level detector 18 controls the gain of the adaptive digital equalizer 16 on the basis of whether a signal level with a minimum period, determined by the viterbi decoder 20 and prestored in the digital level detector 18, conforms to the level of a signal output from the adaptive digital equalizer 16. That is, the digital level detector generates a control signal C using the output of the adaptive digital equalizer 16. Here the control signal C controls the coefficients of, for example, a highpass filter capable of being implemented as the adaptive digital equalizer 16. The coefficients are input from a controller (not shown) via an input port IN2, and the digital level detector 18 transmits the signal C to the adaptive digital equalizer 16.

The adaptive digital equalizer 16 digitally regulates the level of the signal output from the first lowpass filter 16 in response to the control signal C output from the digital level detector 18, and outputs the level-regulated signal to the digital level detector 18 and the viterbi decoder 20. The adaptive digital equalizer 16 can be implemented, for example, as a digital highpass filter, having coefficients controlled by control signal C. However, the control signal C itself can become the coefficients, as described later.

The viterbi decoder 20 decodes the signal output from the adaptive digital equalizer 16 into a bit train composed of digital signals, for example '0' and '1', according to a viterbi decoding technique, and outputs the decoded bit train to the EFDM via an output port OUT. The viterbi decoding method is widely known, and has been disclosed by Roger W. Wood and David A. Petersen, "TRANSACTION DETECTION OF CLASS 4 PARTIAL RESPONSE ON A MAGNETIC RECORDING CHANNEL" Vol. 34, pp. 454–461 (May, 1986).

The digital edge detector 22 calculates the degree of sampling accuracy by the analog-to-digital converter 10 using the sum signal generated by the first adder 12, and outputs a phase-control signal PC and a frequency-control signal FC to the reference signal generator 24 according to the calculated accuracy. The reference signal generator 24 in turn generates a reference clock signal PCLK having a frequency which varies in response to the phase control signal PC and frequency control signal FC output from the digital edge detector 22. The reference clock signal is provided externally, as well as internally to the analog-to-digital converter 10.

Figure 2:
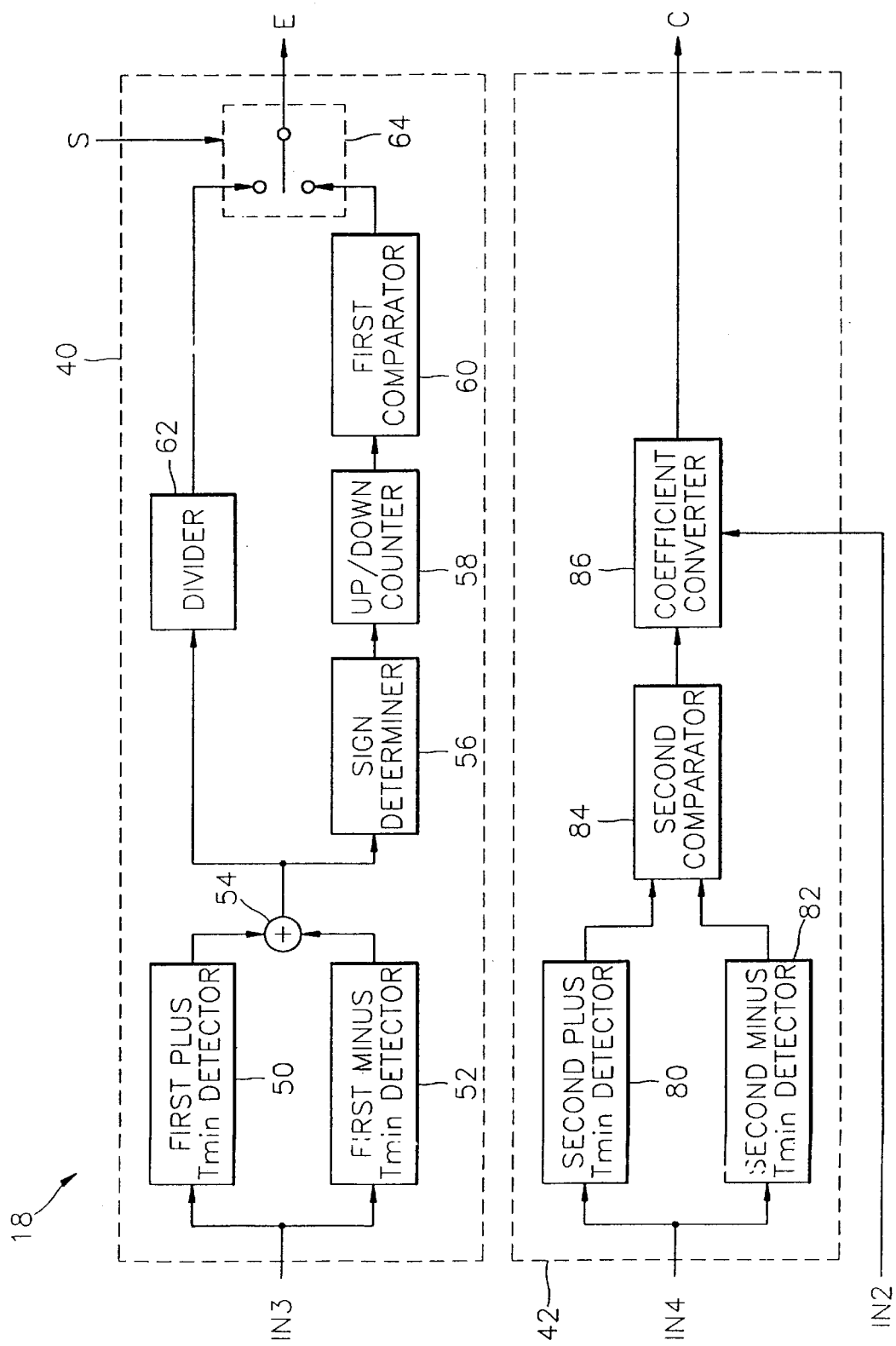
FIG. 2 is a block diagram of the digital level detector shown in FIG. 1, according to a preferred embodiment of the present invention.

FIG. 2 is a block diagram of the digital level detector 18 shown in FIG. 1, including: an asymmetry correction unit 40 having a first-plus-Tmin detector 50, a first-minus-Tmin detector 52, a second adder 54, a sign determiner 56, an up/down counter 58, a first comparator 60, a divider 62 and a switch 64; and an adaptive coefficient control unit 42 having a second-plusTmin detector 80, a second-minus-Tmin detector 82, a second comparator 84 and a coefficient converter 86.

Figure 3A:
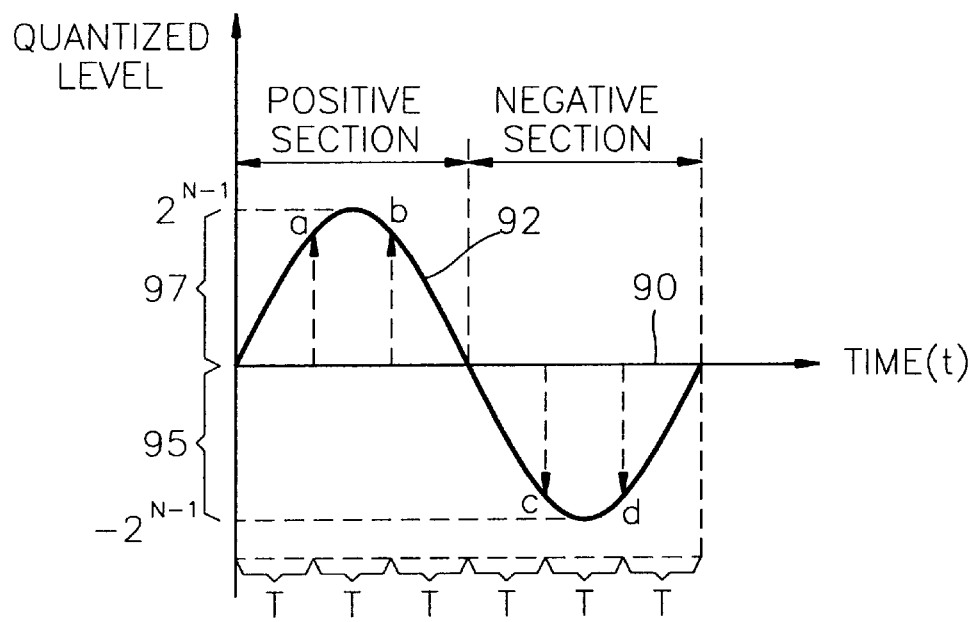
FIGS. 3A and 3B are exemplary wave forms of an RF signal without asymmetry error and an RF signal having asymmetry error, respectively.
Figure 3B:
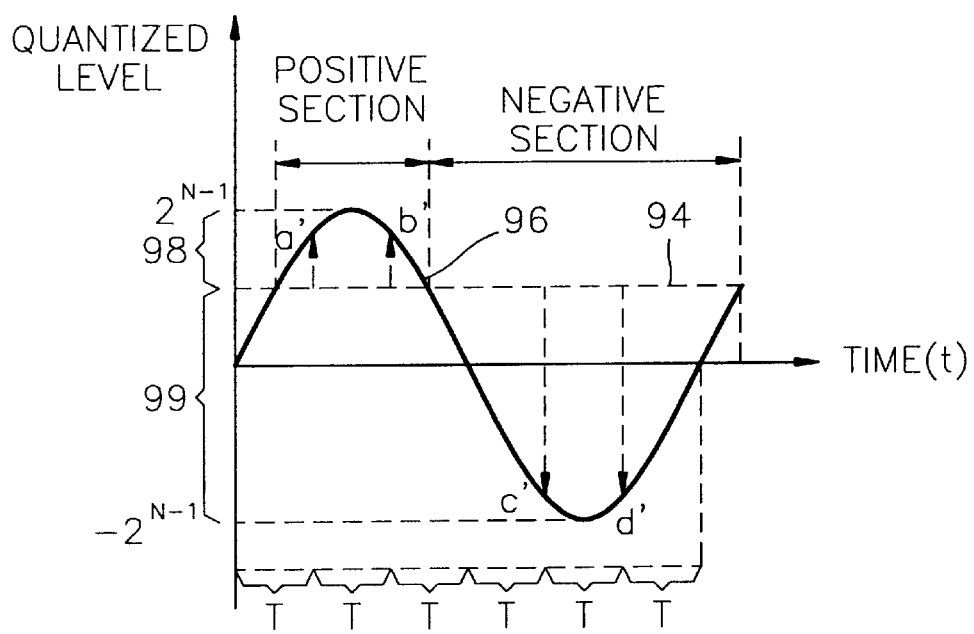

FIG. 3A shows an exemplary waveform of an RF signal 92 which does not have asymmetry error. FIG. 3B shows an exemplary waveform of an RF signal 96 which has asymmetry error.

Referring to FIGS. 1, 3A and 3B, the analog-to-digital converter 10 quantizes to $2^N$ levels, the level between peaks of the analog RF signal 92 or 96, respectively, shown in FIGS. 3A or 3B, presented at input IN1. Then, the quantized levels $2^N$ are output to the adder 12 as the converted digital RF signal. If the analog RF signal 92 does not have asymmetry error, then the reference level 90 corresponds to a mid level among the levels between peaks as shown in FIG. 3A. However, if the analog RF signal 96 has asymmetry error, the reference level 94 may be at the level shown in FIG. 3B.

The asymmetry correction unit 40 shown in FIG. 2 performs the first of the two functions of the digital level detector 18 stated above. That is, the asymmetry correction unit 40 calculates the degree of asymmetry error E in the output of the first adder 12 (see FIG. 1) input via an input port IN3.

For this, the first-plus-Tmin detector 50 receives the output of the first adder 12 via the input port IN3, and adds two quantized levels, for example, a and b, or a' and b' as shown in FIGS. 3A or 3B, at the center among a first predetermined number of quantized levels existing within a positive 3T section (here, T represents the period of the reference clock signal PCLK). The positive 3T section refers to the section in which the quantized levels greater than the reference level 90 or 94 in the 3T exist. The first-minus-Tmin detector 52 receives the output of the first adder 12 via the input port IN3, and adds the two quantized levels, for example, c and d, or c' and d' as shown in FIGS. 3A or 3B, at the center among the second predetermined number of quanitzed levels existing within a negative 3T section. Here, the negative 3T section refers to the section in which the quantized levels smaller than the reference levels 90 or 94 in the 3T exist. For example, each of the first and second predetermined numbers can be $2^{N-1}$ 95 or 97 as shown in FIG. 3A, if the RF signal has no asymmetry error. However, the first of second predetermined number can be less than $2^{N-1}$ 98 or greater than $2^{N-1}$ 99 as shown in FIG. 3B, if the RF signal has the asymmetry error. Finally, the first-plus-Tmin detector 50 outputs the addition result, for example, a+b or a'+b', and first-minus-Tmin detector 52 outputs the addition result, for example, c+d or c'+d'.

Returning to FIG. 2, the second adder 54 combines the output of the first-plus-Tmin detector 50 and the output of the first-minus-Tmin detector 52, and transmits the result, for example a+b+c+d or a'+b'+c'+d', of the addition to the sign determiner 56 and the divider 62.

The sign determiner 56 determines whether the sign of the output of the second adder 54 is positive or negative, and outputs the result of the determination to the up/down counter 58. The up/down counter 58 performs upward or downward counting according to the result determined by the sign determiner 56. For example, if the sign is positive and not zero, the count is increased and if the sign is negative or zero, the count is decreased. The first comparator 60 compares the value counted by the up/down counter 58 with a first predetermined value, and outputs a voltage level corresponding to +1 or −1 to a switch 64 according to the result of the comparison. The first predetermined value may represent an offset value empirically determined by a user. If the counted value is equal to the first predetermined value, the first comparator 60 outputs a voltage level of +1 or −1 to the switch 64.

The divider 62 divides the result of the addition of the second adder 54 by 2, and outputs the divided value to the switch 64. The switch 64 selectively outputs the output of the divider 62 or the output of the first comparator 60 as the asymmetry error amount E in response to a selection signal S. Here, the selection signal S is generated so that the output of the first comparator 60 can be output as the asymmetry error amount E in the case when asymmetry can be corrected according to how many times the asymmetry occurs, and the output of the divider 62 can be output as the asymmetry error amount E in the case where asymmetry is to be corrected regardless of how many times the asymmetry occurs.

The adaptive coefficient control unit 42 performs the second function of the digital level detector 18. That is, the adaptive coefficient control unit 42 generates a control signal C corresponding to the output level of the adaptive digital equalizer 16 (see FIG. 1) input via an input port IN4. For this, the second-plus-Tmin detector 80 receives a signal output from the adaptive digital equalizer 16, via the input port IN4, and selects a quantized level, from among the first predetermined number of quantized levels existing within the positive 3T section. The second-minus-Tmin detector 82 receives a signal output from the adaptive digital equalizer 16, via the input port IN4, and selects a quantized level, corresponding to the quantized level selected by the second-plus-Tmin detector 80, from among the second predetermined number of quantized levels existing within the negative 3T section. For example, when quantized levels 0, 8, 9 and 0 exist in the positive 3T section and quantized levels 0, −13, −15 and 0 exist in the negative 3T section, if the second-plus-Tmin detector 80 selects '8', the second-minus-Tmin detector 82 will select '−13'.

The second comparator 84 compares the absolute value of the quantized level selected by the second-plus-Tmin detector 80 or the second-minus-Tmin detector 82 with an empirically-estimated quantized level, i.e., a signal level with the aforementioned minimum period, and outputs the result of the comparison to the coefficient converter 86. The coefficient converter 86, in an initial state, outputs a control signal C corresponding to highpass filter coefficients input from the microcomputer via the input port IN2. Following the initial state, the coefficient converter 86 adjusts the highpass filter coefficients according to the result of the comparison by the second comparator 84, and outputs the adjusted result as the control signal C. For example, the coefficient converter 86, following the initial state, reduces the absolute values of coefficients input via the input port IN2 and outputs the reduced result as the control signal C if the absolute value of the quantized level selected by the second-minus-Tmin detector 82 is greater than an estimated quantized level.

Figure 4:
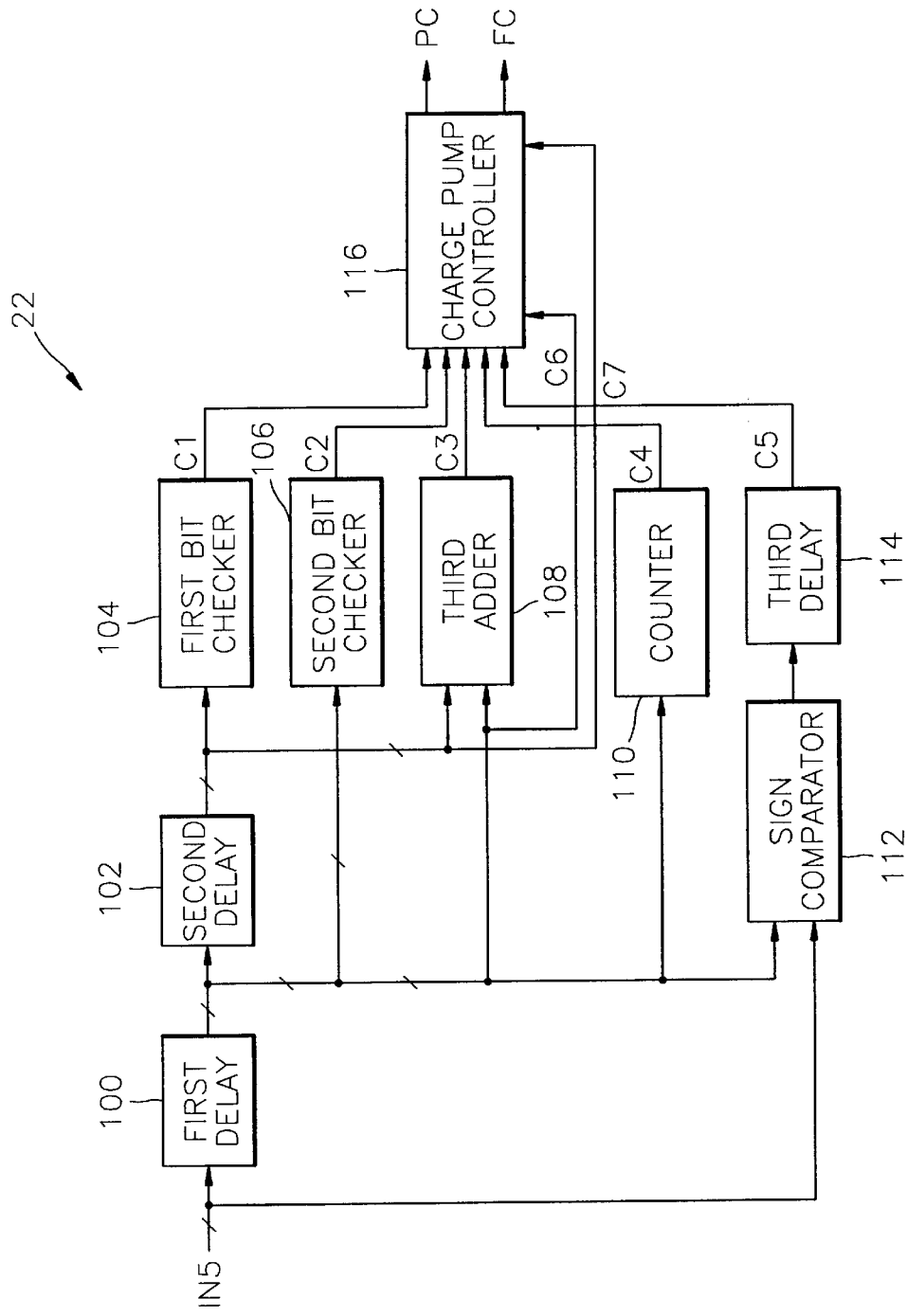
FIG. 4 is a block diagram of the digital edge detector shown in FIG. 1, according to an alternative embodiment of the present invention.

FIG. 4 is a block diagram of the digital edge detector 22 shown in FIG. 1, which includes first, second and third delays 100, 102 and 114, first and second bit checkers 104 and 106, a third adder 108, a counter 110, a sign comparator 112 and a charge pump controller 116.

The first delay 100 shown in FIG. 4 receives an asymmetry error-corrected digital RF signal output from the first adder 12, via an input port IN5, delays the received signal for one period T of the reference clock signal PCLK and outputs the delayed signal. The second delay 102 delays the digital RF signal delayed by the first delay 100 for one period T, and outputs the delayed signal. The first bit checker 104 determines whether all bits of the digital RF signal output by the second delay 102 are '0', and outputs the checked result C1 to the charge pump controller 116. The second bit checker 106 determines whether all bits of the output digital RF signal output from the first delay 100 are '0', and outputs the checked result C2 to the charge pump controller 116. The third adder 108 sums the outputs of the first and second delays 100 and 102, and outputs the sum C3 to the charge pump controller 116.

The counter 110 counts in response to the most significant bit (MSB) of the digital RF signal output from the first delay 110, and outputs a maximum value C4 among counted values to the charge pump controller 116. That is, the counter 110 counts how long the sign of the output of the first delay 100 does not change, resets the counted value when the sign is changed, and outputs the highest value among the counted values as a maximum value (or maximum time) C4 to the charge pump controller 116.

The sign comparator 112 compares the MSB of the digital RF signal output from the first adder 12 via the input port IN5 with the MSB of the digital RF signal output from the first delay 100, and outputs the result of comparison to the third delay 114. The third delay 114 delays the result of the comparison by the sign comparator 112 for one period T, and outputs the delayed result C5 to the charge pump controller 116.

The charge pump controller 116 receives the output C3 of the third adder 108 in response to the outputs C1 and C2 of the first and second bit checkers 102 and 104, outputs the phase control signal PC corresponding to the output C3 of the third adder 108 and the output C5 of the third delay 114, compares the output C4 of the counter 110 with a second predetermined value, and outputs the frequency control signal FC corresponding to the result of the comparison. Here, the second predetermined value is 11T in the case of a CD system, and 14T in the case of a DVD system.

Figure 5:
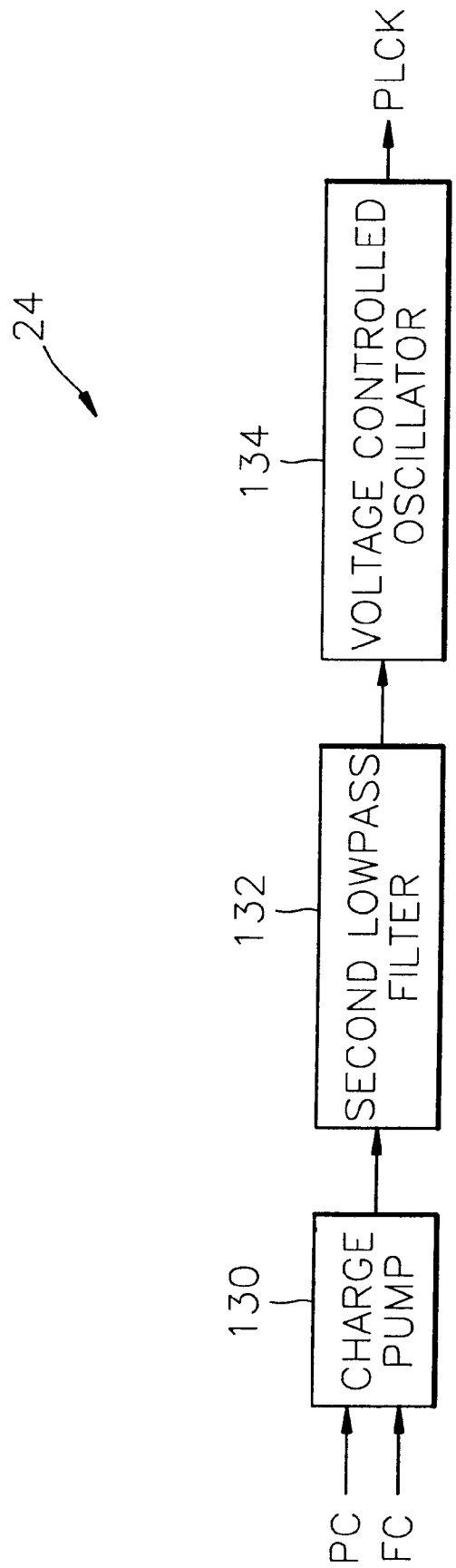
FIG. 5 is a block diagram of the reference signal generator shown in FIG. 1, according to the present invention.

FIG. 5 is a block diagram of the reference signal generator 24 shown in FIG. 1, which includes a charge pump 130, a second lowpass filter 132, and a voltage controlled oscillator 134.

The charge pump 130 shown in FIG. 5 outputs to the second lowpass filter 132 a signal corresponding to an amount of charge sunk or sourced in response to the phase and frequency control signals PC and FC output from the charge pump controller 116 of FIG. 4. The second lowpass filter 132 filters a low frequency component of the signal output from the charge pump 130, and outputs the filtered signal as a control voltage signal to the voltage controlled oscillator 134.

The voltage controlled oscillator 134 outputs a reference clock signal PCLK having a frequency 1/T which varies in response to the control voltage signal output from the second lowpass filter 132.

Hereinafter, a data recovery method according to the present invention, which is performed in the data recovery apparatus shown in FIG. 1, is described referring to the attached drawings.

FIG. 6 is a flowchart illustrating the data recovery method according to the present invention, which is performed in the data recovery apparatus shown in FIG. 1. The method includes step 150 of converting an analog RF signal into a digital RF signal, step 152 of generating the reference clock signal in which sampling error has been compensated, compensating for an asymmetry error, and digitally controlling the level of the digital RF signal, and step 154 of obtaining a bit train.

Referring to FIG. 6, as described above, in step 150 an analog RF signal is converted into a digital RF signal by sampling according to the reference clock signal PCLK having the controlled frequency and phase. Following this, the adder 12 and the digital level detector 18 of FIG. 1 compensate for the asymmetry error, the digital edge detector 22 and the reference signal generator 24 control the frequency and the phase of the reference clock signal PCLK, and the adaptive digital equalizer 16 and the digital level detector 18 digitally equalize the digital RF signal, in step 152.

FIG. 7 is a flowchart illustrating the asymmetry error compensation method of step 152 shown in FIG. 6, according to the present invention. The method includes steps 156 and 158 of compensating for the asymmetry error according to whether the asymmetry error exists. Referring to FIG. 7, the digital level detector 18 of FIG. 1 determines whether an asymmetry error exists, using the digital RF signal as described above, in step 156. Here, the asymmetry corrector 40 shown in FIG. 2 can be used for this determination. If the asymmetry error exists, the asymmetry error is included in the digital RF signal, i.e., the first adder 12 combines the asymmetry error and the digital RF signal, the procedure returns to step 156, according to step 158.

For digitally equalizing the digital RF signal, the adaptive digital equalizer 16 (see FIG. 1) digitally regulates the level of the signal output from the first lowpass filter 14 under the control of the digital level detector 18, as described above.

Figure 8:
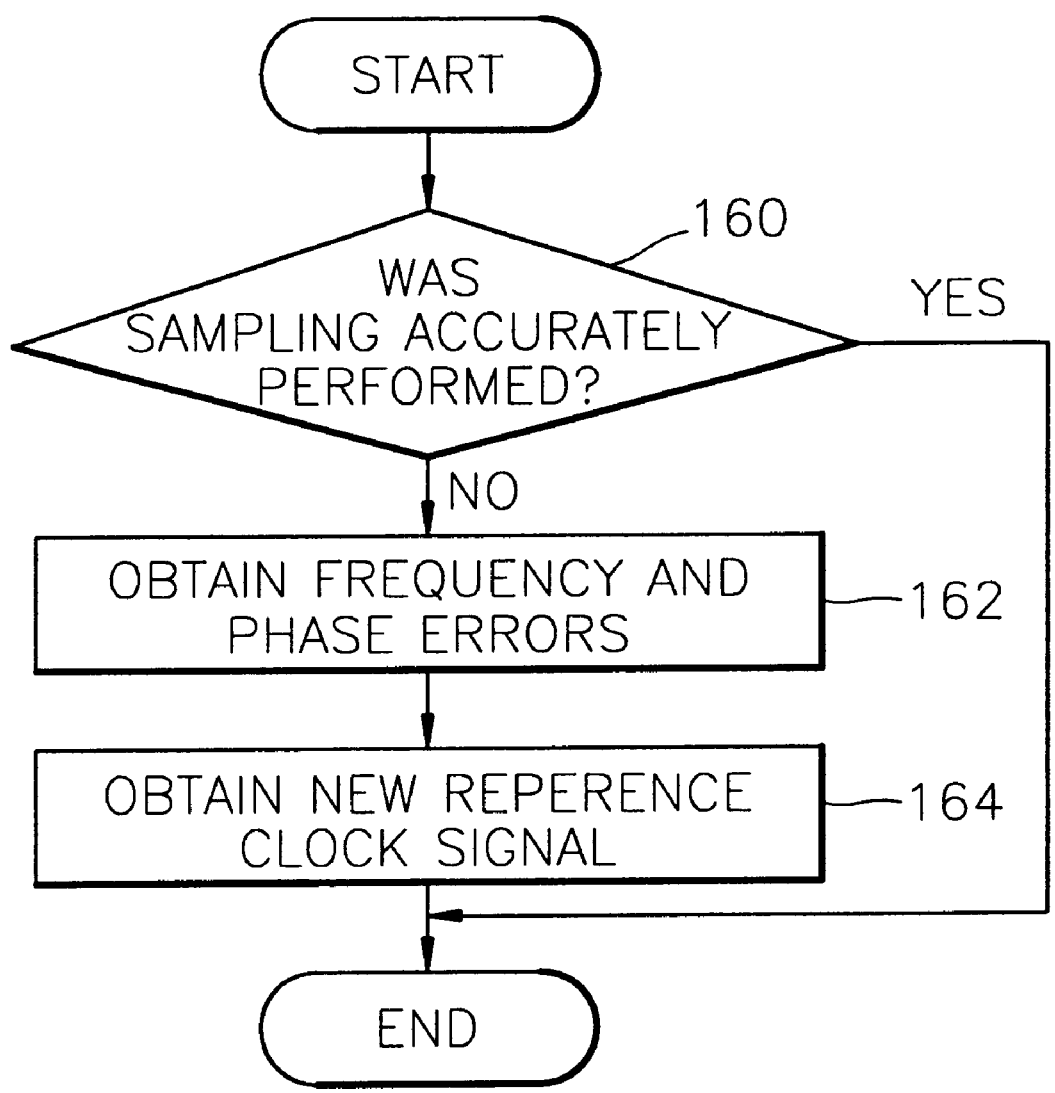
FIG. 8 is a flow diagram illustrating a method for controlling the frequency and the phase of the PCLK of step 152 shown in FIG. 6, according to the present invention.

FIG. 8 is a flowchart illustrating a method for controlling the frequency and phase of the PCLK in step 152 shown in FIG. 6, according to the present invention. The method includes steps 160 through 164 of controlling the frequency and the phase of the PCLK according to the sampling accuracy.

Referring to FIG. 8, it is determined whether sampling was performed accurately when the analog RF signal was converted into the digital RF signal, in step 160. If the sampling was not performed accurately, frequency and phase errors are obtained, in step 162. The steps 160 and 162 can be performed in the digital edge detector 22 shown in FIG. 4.

Following step 162, the reference clock signal PCLK, having a frequency and a phase which are controlled according to the frequency and phase errors is obtained. For this, the reference signal generator 24 obtains a new reference clock signal PCLK in response to a frequency error signal corresponding to the frequency error and a phase error signal corresponding to the phase error, as described above, in step 164. Therefore, the ADC 10 shown in FIG. 1 can exactly convert the analog RF signal into the digital RF signal according to the new reference clock signal PCLK.

Figure 9:
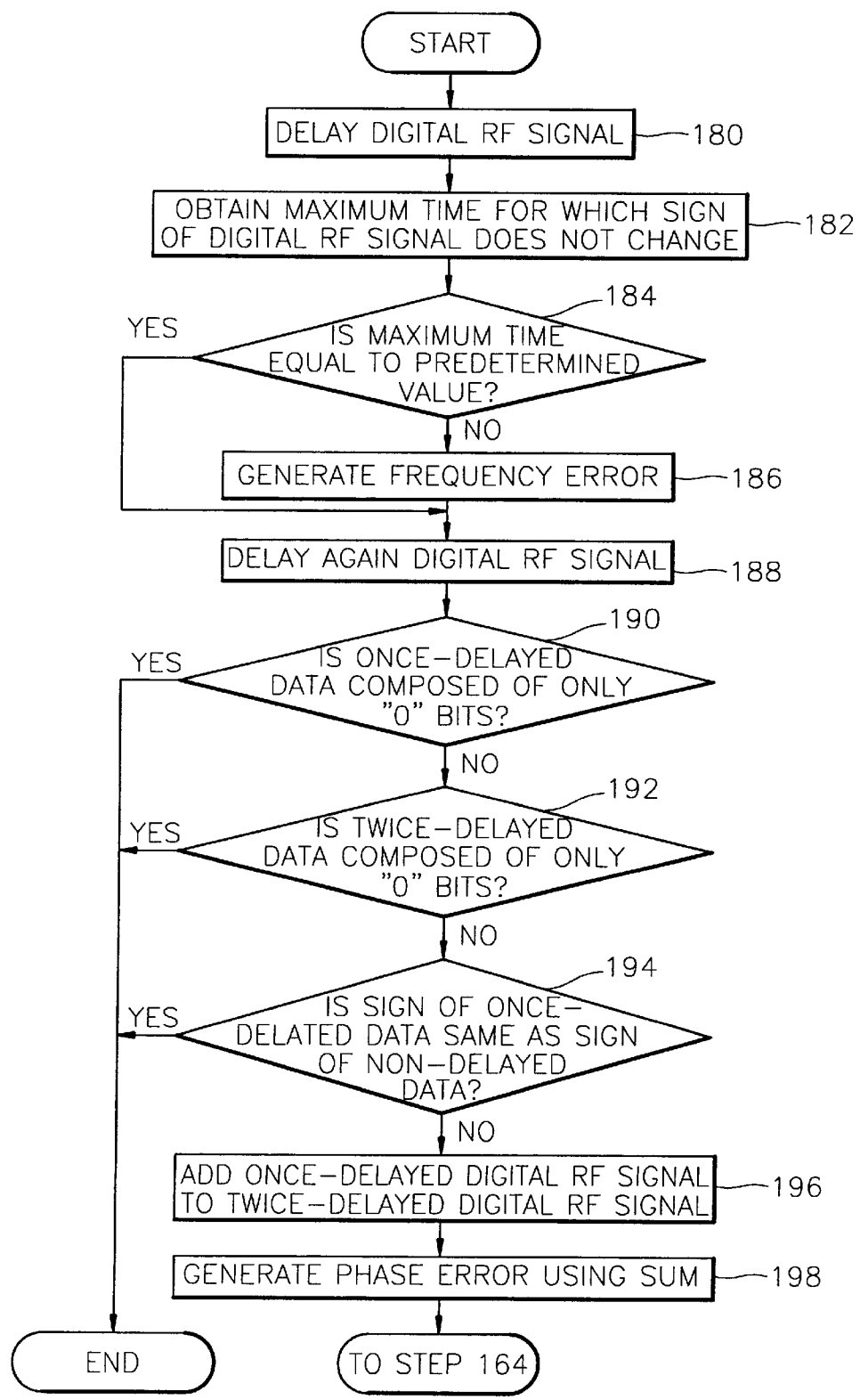
FIG. 9 is a flow diagram illustrating the details of steps 160 and 162 shown in FIG. 8, according to the present invention.

FIG. 9 is a flowchart illustrating steps 160 and 162 shown in FIG. 8, which is comprised of steps 180, 182, 184, 188, 190, 192 and 194 of determining whether sampling was accurately performed, and steps 186, 196 and 198 of obtaining frequency and phase errors.

The method shown in FIG. 9 is performed in the digital edge detector 22 shown in FIG. 4. The first delay 100 delays the digital RF signal by T, in step 180. The counter 110 calculates the maximum time for which the MSB of the delayed digital RF signal remains at the same level during step 182. That is, the counter 110 calculates the maximum time for which the sign of the delayed digital RF signal does not change. Next, the charge pump controller 116 determines whether the maximum time is the same as a predetermined value, for example 11T or 14T, in step 184. If the maximum time is equal to the predetermined value, the charge pump controller 116 generates no frequency error signal FC, and the procedure proceeds to step 188. However, if the maximum time is not the same as the predetermined value, the charge pump controller 116 generates a frequency error signal FC to increase or decrease the frequency varied by the voltage controlled oscillator 134, in step 186.

The digital RF signal delayed by the first delay 100 for T is again delayed for T by the second delay 102 in step 188. Following this, the second bit checker 106 determines whether all bits of the digital RF signal delayed by the first delay 100 are '0', and if so, the procedure ends, in step 190. However, if every bit is not '0', the first bit checker 104 determines whether all bits of the digital RF signal delayed by the second delay 102 are '0', and if so, the procedure ends, in step 192. On the other hand, if the bits of the digital RF signal delayed by the second delay 102 are not all '0', the sign comparator 112 determines whether the sign of the once-delayed digital RF signal is the same as that of the non-delayed digital RF signal. Here, if the sign of the once-delayed digital RF signal is the same as that of the non-delayed digital RF signal, the procedure ends, in step 194. That is, if the signs are the same, it is considered that there is no phase difference, so that the phase error signal PC is not generated.

On the other hand, if it is determined in step 194 that the signs are not the same, i.e. there is a phase difference, the third adder 108 adds the signals delayed by the first and second delays 100 and 102, in step 196. Then, the charge pump controller 116 generates the phase error PC using the sum C3, in step 198. That is, if the once-delayed digital RF signal and/or the twice-delayed digital RF signal are not composed of '0' bits, the charge pump controller 116, compares the sign of the input C3 with the signs of C6 and C7, and generates the phase error signal PC to allow the phase of the reference clock signal PCLK to lag or lead according to the result of the comparison. When both the once-delayed and twice-delayed digital RF signals are composed of '0' bits, which is the initial state, the phase error signal PC is not generated.

Following step 152, the viterbi decoder 20 decodes the digital RF signal, output from the adaptive digital equalizer 16, using a viterbi decoding technique to obtain a bit train, in step 154. Then, the bit train obtained by the step 154 is converted into a bit train composed of 8 bits by an EFDM (not shown).

The above-described data recovery apparatus according to the present invention is applicable to any of a number of optical disk reproduction systems, such as a CD system or a DVD system.

As described above, in the data recovery apparatus and method according to the present invention for an optical disk reproduction system, data for EFDM is digitally recovered from the analog RF signal, so that data recovery capability is improved. Since the sampling frequency of the analog-to-digital converter is varied by the reference clock signal PCLK even though the speed multiple of the disk varies, the present invention can be generally used in a data reproduction channel with the same modulation method. Also, when the data recovery apparatus is produced as a chip, the chip is smaller and power consumption is lower than that of an analog system.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A data recovery apparatus in an optical disk reproduction system including a photodiode and a demodulator comprising:

an analog-to-digital converter for converting an analog radio frequency (RF) signal input from the photodiode into a digital RF signal in response to a reference clock signal;

a first adder for combining the digital RF signal with an asymmetry error signal;

an adaptive digital equalizer for controlling the level of the digital RF signal in response to an equalizer control signal, and for generating an equalized digital RF signal;

a digital level detector for calculating the degree of asymmetry error in the digital RF signal, and for generating the asymmetry error signal in response to the asymmetry error, the digital level detector further generating the equalizer control signal in response to the equalized digital RF signal;

a decoder for decoding the equalized digital RF signal to generate a bit train for transmission to the demodulator;

a digital edge detector for determining the accuracy of sampling by the analog-to-digital converter using the digital RF signal, and for generating phase and frequency control signals according to the determined accuracy; and a reference signal generator for generating the reference clock signal having a frequency which varies in response to the phase and frequency control signals.

2. The data recovery apparatus of claim 1 wherein the demodulator comprises an eight-to-fourteen demodulator (EFDM).

3. The data recovery apparatus of claim 1 wherein the decoder comprises a viterbi decoder.

4. The data recovery apparatus of claim 1 wherein the digital level detector further generates the equalizer control signal based on predetermined filter coefficients.

5. The data recovery apparatus of claim 4, wherein the digital level detector comprises:

an asymmetry corrector for generating the asymmetry error signal based on the digital RF signal; and an adaptive coefficient controller for generating the equalizer control signal according to the output of the adaptive digital equalizer and the predetermined filter coefficients.

6. The data recovery apparatus of claim 5, wherein the asymmetry corrector comprises:

a first-plus-Tmin detector for adding K middle levels among a first predetermined number of quantized levels within a positive 3T section detected in the combined digital RF signal output of the first adder, where K is a natural number of at least two and T is the period of the reference clock signal;

a first-minus-Tmin detector for adding the K middle levels among a first predetermined number of quantized levels within a negative 3T section detected in the combined digital RF signal output of the first adder;

a second adder for adding the outputs of the first-plus-Tmin detector and the first-minus-Tmin detector;

a sign determiner for determining the sign of the result added by the second adder;

an up/down counter for up-counting or down-counting according to the result determined by the sign determiner; and a first comparator for comparing a value counted by the up/down counter with a predetermined value and outputting either +1 or −1 as the asymmetry error amount according to the result of the comparison.

7. The data recovery apparatus of claim 6, wherein the asymmetry corrector further comprises:

a divider for dividing the result added by the second adder by K; and a selector for selectively outputting either the result divided by the divider or the result compared by first comparator as the asymmetry error, in response to a selection signal, wherein the selection signal is generated depending on whether asymmetry error is to be corrected according to how many times the asymmetry errors occur.

8. The data recovery apparatus of claim 5, wherein the adaptive coefficient controller comprises:

a second-plus-Tmin detector for selecting an arbitrary quantized level among a second predetermined number of quantized levels within a positive 3T section detected in the equalized digital RF signal, where T is the period of a reference clock signal;

a second-minus-Tmin detector for selecting the arbitrary quantized level, corresponding to the quantized level selected in the second-plus-Tmin detector, among a second predetermined number of quantized levels within a negative 3T section detected in the equalized digital RF signal;

a second comparator for comparing the absolute value of the output of the second-plus-Tmin detector or second-minus-Tmin detector with an estimated quantized level corresponding to the 3T section; and a coefficient converter for outputting the equalizer control signal generated according to the result of the comparison by the second comparator based on the predetermined coefficients.

9. The data recovery apparatus of claim 1 further comprising: a first lowpass filter for filtering a low frequency component of combined result of the first adder and for outputting the filtered result to the adaptive digital equalizer.

10. The data recovery apparatus of claim 1, wherein the digital edge detector comprises:
 a first delay for delaying the result added by the first adder for a predetermined time;
 a second delay for delaying the result delayed by the first delay for a predetermined time;
 a first bit checker for checking whether the bits of a signal output from the second delay are all at a first logic level;
 a second bit checker for checking whether the bits of a signal output from the first delay are all at the first logic level;
 a third adder for adding the outputs of the first and second delays to each other;
 a counter for counting in response to the most significant bit (MSB) of the signal output from the first delay and for outputting a maximum value among counted values;
 a sign comparator for comparing the signs of the signals output from the first adder and first delay with each other;
 a third delay for delaying the result of the comparison by the sign comparator for the predetermined time; and
 a charge pump controller for receiving the output of the third adder in response to the outputs of the first and second bit determiners and for outputting the phase control signal corresponding to the outputs of the third adder and third delay, and comparing the output of the counter with a second predetermined value and outputting the frequency control signal according to the result of the comparison.

11. The data recovery apparatus of claim 10, wherein the reference signal generator comprises:
 a charge pump for outputting a signal corresponding to an amount of charge sunk or sourced in response to the phase control signal and the frequency control signal;
 a second lowpass filter for filtering a low frequency component of the signal output from the charge pump and outputting the filtered result as a control voltage signal; and
 a voltage controlled oscillator for outputting the reference clock signal having a frequency which is variable varied in response to the control voltage signal.

12. A data recovery method in an optical disk reproduction system including a photodiode and a demodulator comprising:
 converting an analog radio frequency (RF) signal input from the photodiode into a digital RF signal in response to a reference clock signal at an analog-to-digital converter;
 combining the digital RF signal with an asymmetry error signal at a first adder;
 controlling the level of the digital RF signal in response to an equalizer control signal and generating an equalized digital RF signal at an adaptive digital equalizer;
 calculating the degree of asymmetry error in the digital RF signal, generating the asymmetry error signal in response to the asymmetry error, and further generating the equalizer control signal in response to the equalized digital RF signal at a digital level detector;
 decoding the equalized digital RF signal to generate a bit train for transmission to the demodulator at a decoder;
 determining the accuracy of sampling by the analog-to-digital converter in the digital RF signal, and generating phase and frequency control signals according to the determined accuracy at a digital edge detector; and
 generating the reference clock signal having a frequency which varies in response to the phase and frequency control signals.

13. The data recovery method of claim 12 further comprising generating, at the digital level detector, the equalizer control signal based on predetermined filter coefficients.

14. The data recovery method of claim 13, further comprising, at the digital level detector:
 obtaining the asymmetry error signal based on the digital RF signal, at an asymmetry corrector; and
 generating the equalizer control signal, at an adaptive coefficient controller, according to the output of the adaptive digital equalizer and the predetermined filter coefficients.

15. A data recovery method performed in an optical disk reproduction system including a photodiode for outputting an analog RF signal and an eight to fourteen demodulator (EFDM) for converting the pattern of a bit train, the method comprising the steps of:
 (a) obtaining a digital RF signal by converting the analog RF signal to a digital RF signal by sampling according to a reference clock signal;
 (b) compensating for asymmetry error in the digital RF signal, controlling frequency and phase of the reference clock signal according to an accuracy degree of sampling, and digitally equalizing the digital RF signal; and
 (c) obtaining the bit train by Viterbi-decoding the equalized digital RF signal.

16. The data recovery method as claimed in claim 15, wherein step (b) comprises the steps of:
 (b1) determining whether the asymmetry error exists, using the digital RF signal; and
 (b2) compensating for the asymmetry error by including the asymmetry error amount in the digital RF signal, if the asymmetry error exists, and returning to the step (b1).

17. The data recovery method as claimed in claim 16, wherein the step (b) further comprises the steps of:
 (b3) determining whether the sampling was performed accurately;
 (b4) obtaining frequency and phase errors using the digital RF signal, if the sampling was not accurately performed; and
 (b5) controlling frequency and phase of the reference clock signal according to frequency and phase errors corresponding to the accuracy degree, and obtaining the reference clock signal having controlled frequency and phase.

18. The data recovery method in an optical disk reproduction system as claimed in claim 17, wherein the steps (b3) and (b4) comprises the steps of:
 (d1) delaying the digital RF signal whose asymmetry error was corrected, for a predetermined time;

(d2) calculating maximum time for which the most significant bit (MSB) of the delayed digital RF signal is generated at the same level;

(d3) determining whether the maximum time is the same as a predetermined value;

(d4) generating the frequency error if the maximum time is not the same as the predetermined value;

(d5) delaying again for the predetermined time the digital RF signal delayed for the predetermined time, if the maximum time is the same as the predetermined value or after the step (d4);

(d6) determining whether the bits of a once-delayed digital RF signal are all a first logic level;

(d7) determining whether the bits of a twice-delayed digital RF signal are all a first logic level, if the bits of the once-delayed digital RF signal are not all the first logic level;

(d8) determining whether the sign of the once-delayed digital RF signal is the same to the sign of the asymmetry error-corrected digital RF signal, if the bits of the twice-delayed digital RF signal are not all the first logic level;

(d9) adding the once-delayed digital RF signal to the twice-delayed digital RF signal, if the sign of the once-delayed digital RF signal is not equal to the sign of the asymmetry error-corrected digital RF signal; and (d10) comparing the result of the addition in the step (d9) with the signs of the once- and/or twice-delayed digital RF signals, generating the phase error according to the result of the comparison, and proceeding to the step (b5).

* * * * *